D. C. WATT & F. A. GREARSON.
VEHICLE TOP OPERATING MECHANISM.
APPLICATION FILED FEB. 11, 1914.
1,154,463.
Patented Sept. 21, 1915.
2 SHEETS—SHEET 1.
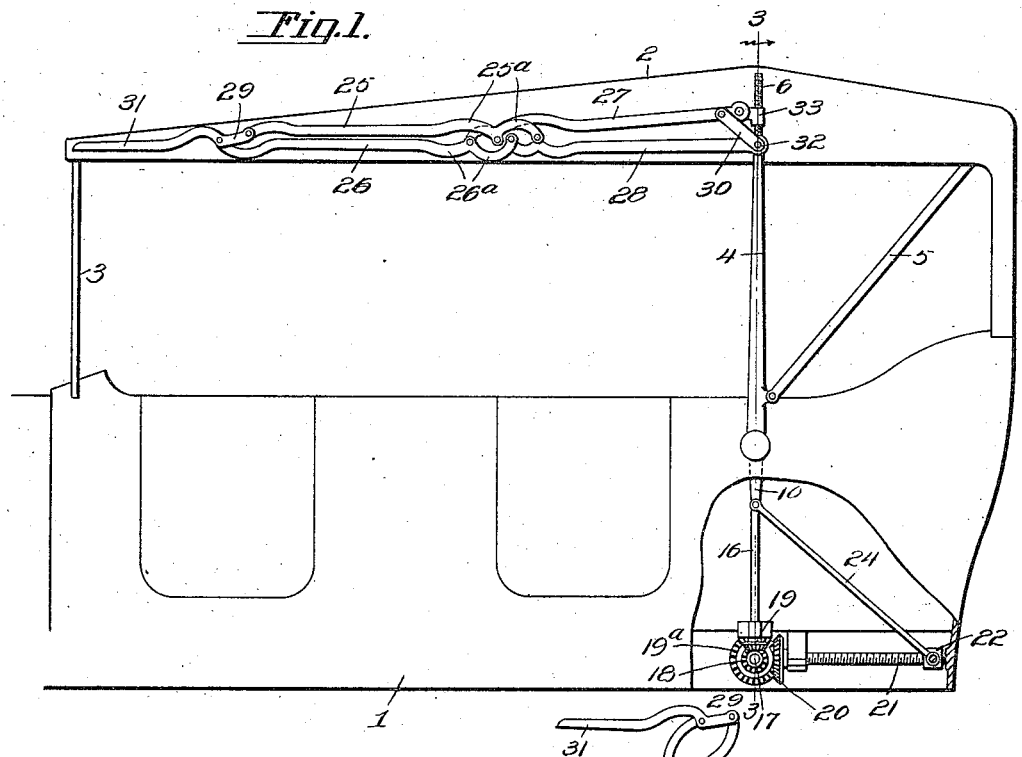
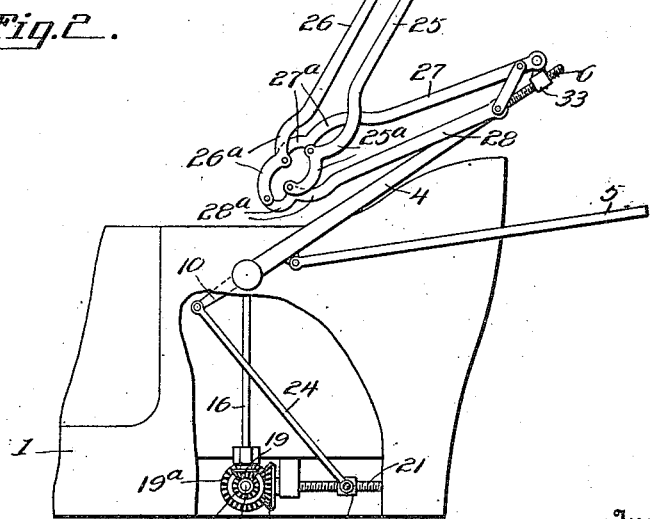
Witnesses
F. C. Gibson.
V. B. Hillyard.
Inventors
Delton C. Watt.
Frederick A. Grearson.
By Victor J. Evans
Attorney D. C. WATT & F. A. GREARSON.
VEHICLE TOP OPERATING MECHANISM.
APPLICATION FILED FEB. 11, 1914.

1,154,463.

Patented Sept. 21, 1915.
2 SHEETS—SHEET 2.

Witnesses
F. C. Gibson.
V. B. Hillyard.

Inventors
Delton C. Watt.
Frederick A. Grearson.

By Victor J. Evans
Attorney

UNITED STATES PATENT OFFICE.

DELTON CHARLES WATT AND FREDERICK AUGUSTUS GREARSON, OF BARRE, VERMONT.

VEHICLE TOP-OPERATING MECHANISM.

1,154,463.

Specification of Letters Patent.  Patented Sept. 21, 1915.

Application filed February 11, 1914.  Serial No. 818,093.

*To all whom it may concern:*

Be it known that we, DELTON C. WATT and FREDERICK A. GREARSON, citizens of the United States, residing at Barre, in the county of Washington and State of Vermont, have invented new and useful Improvements in Vehicle Top-Operating Mechanism, of which the following is a specification.

The present invention appertains to vehicle tops and more particularly to the mechanism whereby such tops may be mechanically raised or lowered thereby enabling such operation to be performed by a single person with comparative ease and safety both to the operator and the top.

The invention provides a novel mechanism which may be actuated by suitable power for imparting movement to the vehicle top both when raising or lowering the same, said mechanism being of such construction as to be out of the way and not interfere with any of the working parts when adapted to a motor vehicle.

The invention further consists of novel means for extending or retracting the top, such means including a system of levers having a parallelogrammatic movement and arrangement and disposed in such a manner as to occupy a minimum amount of space in either extreme position.

The invention also further consists of the novel features, details of construction and combination of parts, which hereinafter will be more particularly set forth, illustrated and claimed.

Figure 3:
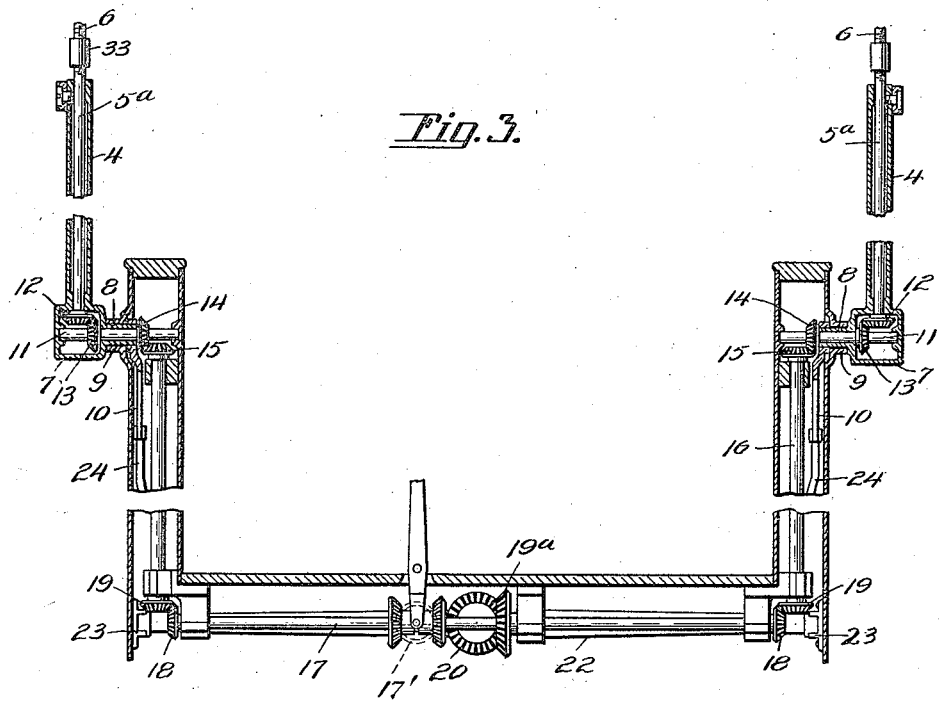
Figure 4:
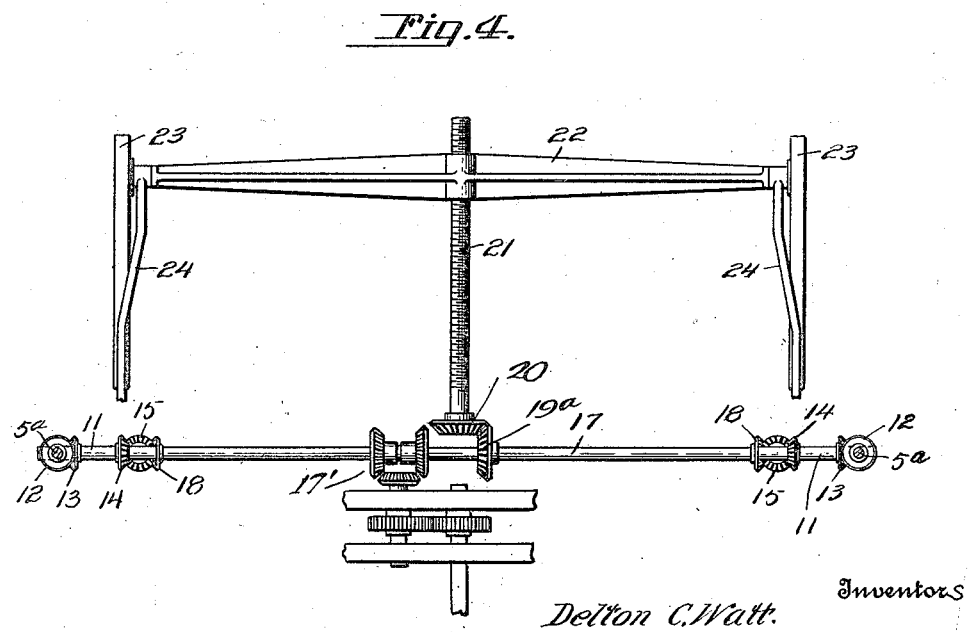

In the accompanying drawings: Figure 1 is a side view of a vehicle body and top provided with operating means embodying the invention. Fig. 2 is a view similar to Fig. 1 showing the relation of the parts when the top is partly folded. Fig. 3 is a transverse section on the line 3—3 of Fig. 1, looking to the right as indicated by the arrow. Fig. 4 is a diagrammatic view.

Corresponding and like parts are referred to in the following description and indicated in all the views of the drawings by the same reference characters.

The numeral 1 designates the body of a vehicle which may be of any variety and 2 is a folding top. The top 2 is of the type applied to vehicles having front and rear seats and provided with front and rear supports which may be of any nature generally provided in tops constructed for motor vehicles. The front support 3 is adapted to be detachably connected with the front portion of the body 1 to admit of the folding and lowering of the top. The support for the rear portion of the top comprises side standards 4 and a bow 5, the latter being pivotally connected to the standards 4. As indicated in Fig. 3 the standards 4 are hollow and receive shafts 5ª which are threaded at their upper ends as indicated at 6. The lower end of each standard 4 is formed with a box portion 7 and a laterally extending journal 8 which is mounted in a boss 9 projecting outwardly from the vehicle body. An arm 10 is secured to the inner end of the hollow journal 8. A shaft 11 is arranged horizontally and is journaled in the part 8 and in the vehicle body and box portion 7 of the standard 4. It will thus be understood that the shaft 11 coincides with the axis about which the standard 4 turns. The shaft 5ª is mounted in the standard 4 which is provided at its lower end with a gear element 12 which engages a companion gear element 13 secured to the shaft 11. A gear element 14 fastened to the shaft 11 engages a gear element 15 at the upper end of a vertical shaft 16 of the body 1. As indicated in Fig. 3 the sides of the vehicle body are made hollow and receive the shafts 16 and arms 10, thereby protecting such parts and concealing them from view. A shaft 17 arranged transversely of the body 1 and beneath the bottom thereof is provided at opposite ends with gear elements 18 which engage gear elements 19 secured to the lower end of the vertical shafts 16. The shaft 17 has a gear element 19ª secured thereto which engages a gear element 20 fastened to one end of a longitudinally arranged screw shaft 21. A cross bar 22 has screw thread engagement with the shaft 21 and its ends engage suitable guides 23 at the sides of the body 1. Links or rods 24 connect the ends of the cross bar 22 with the lower ends of the arms 10. The shaft 17 derives its power from the motor of the vehicle and the driving and controlling means for the shaft is designated by the reference character 17'. Rotation of the shaft 17 in one direction moves the parts in such a manner as to raise or lower the top whereas rotation of the shaft 17 in the opposite direction causes a movement of the parts to elevate or lower the top the reverse of the first movement. Simultaneously with the raising or lowering of the top the same is extended or contracted this being effected by means of the system of levers hereinbefore referred to.

The top is extended or contracted by means of four levers 25, 26, 27 and 28 and two links 29 and 30. It is to be understood that the levers and links are provided in duplicate at the sides of the top 2. The lever 26 has a front extension 31 which supports the extreme front portion of the top 2. The front ends of the levers 25 and 26 are oppositely curved to admit of the levers coming close together when the top is extended. The rear ends of the levers 25 and 26 are formed with oppositely curved portions 25ᵃ and 26ᵃ. The forward ends of the levers 27 and 28 are formed with oppositely curved portions 27ᵃ and 28ᵃ. The front portion of the lever 27 is connected to each of the levers 25 and 26 a short distance from the extremities. The lever 28 is pivotally connected at its front portion to the extremities of the levers 25 and 26. The rear end of the lever 28 is pivotally connected to the upper end of the standard 4 as indicated at 32. The rear end of the lever 27 is pivotally connected to an extension of a nut 33 mounted upon the threaded end 6 of the shaft 5. The link 30 pivotally connects the rim portion of the lever 27 to the rear end of the lever 28. The arrangement and connection of the several levers and rings are such as to insure a parallelogrammatic movement thereof when the nuts 33 are moved on the threaded portions of the shafts 5. When the nuts 33 move upward upon the threaded parts 6 of the shaft 5 the top 2 is contracted and when the nuts 33 are moved downward upon the threaded portion 6 upon the shaft 5 the top is extended. It is to be understood that the nuts 33 are moved simultaneously with the standards 4, hence the top is simultaneously extended and raised, or contracted and lowered.

The operation of this device is briefly described as follows: Assuming the top 2 is in raised position, as shown in Fig. 1 of the drawing, the front support 3 is detached from the body 1 of the vehicle, power is thence transmitted to the transverse shaft 17 through the medium of the motor of the vehicle, causing the shaft 16 to rotate through its gear connections 18 and 19 respectively, and which in turn causes the shaft 5ᵃ to rotate. By the gear 19ᵃ on the transverse shaft 17 at all times meshing with the gear 20 on the screw shaft 21, will cause, when the top is being lowered, an inward movement of the cross bar 22, exerting a forward swinging of the arm 10, by its connection with the link 24, and at the same time the nut 33 is moved upwardly on the threaded portion 6 of the shaft 5ᵃ, whereby the top through the medium of its levers 25, 26, 27 and 28 and the two links 29 and 30 turn the top 2 in collapsed position as clearly shown in Fig. 2. When it is desired to raise the top 2 the shaft 17 is rotated in the opposite direction effecting a reverse movement of the enumerated parts, whereupon the support 3 is permanently fastened to the vehicle body, and the top retained in a raised position.

From the foregoing description, taken in connection with the accompanying drawings, the advantages of the construction and of the method of operation will be readily apparent to those skilled in the art to which the invention appertains, and while we have described the principle of operation of the invention together with the device which we now consider to be the best embodiment thereof, we desire to have it understood that the device shown is merely illustrative, and that such changes may be made when desired as are within the scope of the invention as claimed.

Having thus described the invention what is claimed as new, is:—

1. In a folding vehicle top, the combination of front and rear pairs of levers having their opposing ends oppositely curved, the upper rear lever having its forward portion pivotally connected to the rear portions of the front pair of levers a short distance from their rear extremities and the lower rear lever having its forward portion pivotally connected to the rear extremities of the front pair of levers, links connecting the outer ends of both pairs of levers and means for imparting movement to the levers whereby they receive parallelogrammatic movement and the front levers are caused to fold upon the rear levers.

2. In a folding vehicle top, the combination of pivoted top supports, extensions carried by said supports, a cross bar, links connecting the extremities of the cross bar with the extensions of the top supports and means for imparting a reciprocating movement to the cross bar to effect a raising or a lowering of the top.

3. In a folding top for vehicles, the combination of a pivoted top support, extensions carried by said support, a cross bar, links connecting the extremities of the cross bar with the extensions of the top support, a longitudinally arranged screw connected with the cross bar to effect a reciprocating movement thereof and means for imparting a rotary movement to such screw to effect a raising or a lowering of the top.

4. In combination a vehicle top adapted to be extended or contracted and raised or lowered, a system of levers connected with the top to effect an extension or a contraction thereof, standards supporting the top and pivotally connected with the vehicle body to effect a raising or a lowering of the top, shafts mounted upon said standards and having screw thread connection with the system of levers, means for imparting a pivotal movement to the standards, other means for imparting a rotary movement to the said shafts and operating means for simultaneously actuating both the standards and shafts whereby the top may be extended and raised, or contracted and lowered at one and the same operation.

5. In combination with a vehicle body having hollow sides, a top therefor, standards constituting supports for the top and pivotally connected to the vehicle body, a shaft mounted in the hollow sides of the vehicle body, a second shaft in the standards, a connection between said first and second mentioned shafts, a system of levers and links having connection at one end to the front portion of the top and having connection at their opposite end to said second shaft, and means for imparting a simultaneous movement of said shafts.

6. In combination with a vehicle body having hollow sides, a top therefor, standards constituting supports for the top and pivotally connected to the vehicle body, a shaft mounted in the hollow sides of the vehicle body, a second shaft mounted in said standards, a stub shaft having gear connections with the first and second mentioned shaft, a system of levers and links having connection at one end to the front portion of the top and having connection at their opposite end to said second shaft for extending or contracting the top, and means for imparting a simultaneous movement to said shafts.

In testimony whereof we affix our signatures in presence of two witnesses.

DELTON CHARLES WATT.
FREDERICK AUGUSTUS GREARSON.

Witnesses:
EARLE R. DAVIS,
FRANK A. HUTCHINSON.

Copies of this patent may be obtained for five cents each, by addressing the "Commissioner of Patents, Washington, D. C."